(12) United States Patent
Das et al.

(10) Patent No.: US 11,119,665 B2
(45) Date of Patent: Sep. 14, 2021

(54) DYNAMIC VOLTAGE AND FREQUENCY SCALING BASED ON MEMORY CHANNEL SLACK

(71) Applicant: ADVANCED MICRO DEVICES, INC., Santa Clara, CA (US)

(72) Inventors: Shomit N. Das, Austin, TX (US); Kishore Punniyamurthy, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/212,388

(22) Filed: Dec. 6, 2018

(65) Prior Publication Data

US 2020/0183597 A1  Jun. 11, 2020

(51) Int. Cl.
*G06F 3/06* (2006.01)
(52) U.S. Cl.
CPC .......... *G06F 3/0625* (2013.01); *G06F 3/0653* (2013.01); *G06F 3/0673* (2013.01)
(58) Field of Classification Search
None
See application file for complete search history.

(56) References Cited

U.S. PATENT DOCUMENTS

| 9,268,720 B2* | 2/2016 | Wang | G06F 13/1642 |
| 2006/0112250 A1* | 5/2006 | Walker | G06F 13/1694 711/167 |

OTHER PUBLICATIONS

Ware, Malcom, et al., "Architecting for Power Management: The IIBM® POWER7™ Approach", HPCA—16, The Sixteenth International Symposium on High-Performance Computer Architecture, Jan. 9-14, 2010, 11 pages.

Chatterjee, Niladrish, et al., "Managing DRAM Latency Divergence in Irregular GPGPU Applications", SC 2014 Proceedings of the International Conference for High Performance Computing, Networking, Storage and Analysis, Nov. 16-21, 2014, 12 pages.

Deng, Qingyuan, et al., "MemScale: Active Low-Power Modes for Main Memory", ASPLOS, Mar. 5-11, 2011, Newport Beach, CA, 14 pages.

Deng, Qingyuan, et al., "MultiScale: Memory System DVFS with Multiple Memory Controllers", ISLPED, Jul. 30-Aug. 1, 2012, Redondo Beach, CA, 6 pages.

David, Howard, et al., "Memory Power Management via Dynamic Voltage/Frequency Scaling", ICAC, Jun. 14-18, Karlsruhe, Germany, 10 pages.

(Continued)

*Primary Examiner* — Charles J Choi

(57) ABSTRACT

A processing system scales power to memory and memory channels based on identifying causes of stalls of threads of a wavefront. If the cause is other than an outstanding memory request, the processing system throttles power to the memory to save power. If the stall is due to memory stalls for a subset of the memory channels servicing memory access requests for threads of a wavefront, the processing system adjusts power of the memory channels servicing memory access request for the wavefront based on the subset. By boosting power to the subset of channels, the processing system enables the wavefront to complete processing more quickly, resulting in increased processing speed. Conversely, by throttling power to the remainder of channels, the processing system saves power without affecting processing speed.

20 Claims, 7 Drawing Sheets

(56) References Cited

OTHER PUBLICATIONS

Peres, Martin, "Reverse engineering power management on NVIDIA GPUs—A detailed overview", X.org Developer Conference, 2013, 11 pages.

Nvidia Cuda Toolkit Documentation, Section 1.6 CUPTI Metric API, https://docs.nvidia.com/cuda/cupti/index.html, accessed Dec. 6, 2018, 35 pages.

* cited by examiner

| WAVEFRONT | STATUS | STALL CAUSE BITMASK | | | |
|---|---|---|---|---|---|
| | | MEMORY | REGISTER FILE | BARRIER STALL | INSTRUCTION BUFFER |
| WF0 702 | READY | 0 | 0 | 0 | 0 |
| WF1 704 | STALL | 1 | 0 | 0 | 0 |
| WF2 706 | STALL | 0 | 1 | 0 | 0 |
| WF3 708 | STALL | 0 | 1 | 0 | 0 |

FIG. 7

DYNAMIC VOLTAGE AND FREQUENCY SCALING BASED ON MEMORY CHANNEL SLACK

GOVERNMENT LICENSE RIGHTS

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

High-performance processing systems include multiple processing units, such as graphics processing unit (GPU) cores, and memory systems. GPU cores have parallel compute units that process multiple operations and request access to memory systems concurrently through multiple memory channels. In many applications, such as graphics processing in a GPU, a sequence of work-items (which can also be referred to as threads) are processed in order to output a final result.

During processing, multiple processor cores (referred to as "compute units") are able to execute a thread concurrently with execution of other threads by the other compute units, e.g., according to the single instruction, multiple data (SIMD) execution model. Processing systems cluster threads into wavefronts, or warps, that concurrently execute the same instruction on different data. Execution of a wavefront terminates when all threads within the wavefront complete processing. Generally, the time required for each thread to complete processing depends on a criterion determined by data within the thread. As such, the threads within the wavefront can complete processing at different times. When the processing of all threads has been completed, the SIMD core finishes processing the wavefront.

GPU cores have been widely adopted for use in power critical platforms such as servers and automobiles. Power efficiency is also desirable when running high utilization machine intelligence workloads on specialized hardware. Memory systems consume a significant amount of power in processing systems. Power management techniques such as dynamic voltage and frequency scaling (DVFS) are utilized to allocate power across the memory system components to improve processing performance within a fixed processor power budget.

Some techniques for DVFS rely on performance counters at a memory controller of a memory system to estimate the impact of varying the frequency of the memory controller or use bandwidth demand of an application executing at the processing system to throttle the memory frequency. However, for GPUs, such metrics are only an indirect indication of the impact of memory channel frequency on performance and do not take full advantage of opportunities to save power.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 7 is an illustration of information collected at the scheduler identifying causes of stalls of a wavefront in accordance with some embodiments.

DETAILED DESCRIPTION

Figure 1:
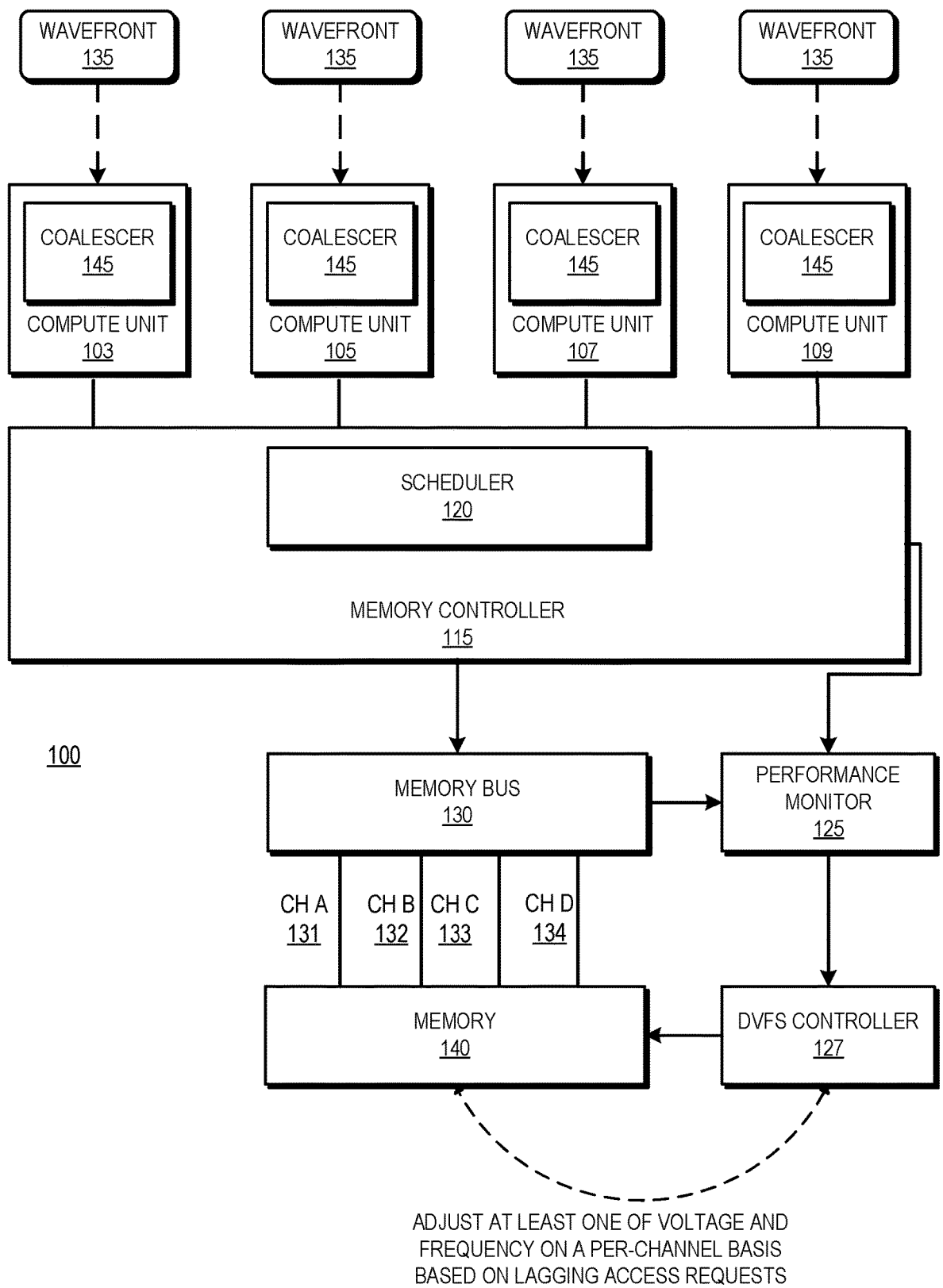
FIG. 1 is a block diagram of a processing system that includes a performance monitor and dynamic voltage and frequency scaling controller for adjusting power on a per-memory-channel basis based on lagging memory access requests at a subset of channels in accordance with some embodiments.

FIGS. 1-8 illustrate techniques for scaling power to memory and memory channels based on identifying causes of stalls of threads of a wavefront. A scheduler of a processing system identifies whether a wavefront including a plurality of threads schedulable for concurrent execution are ready to be scheduled for execution. If the wavefront is not ready to be scheduled, the scheduler determines, based on information received from GPU counters, whether threads of the wavefront are not schedulable due to outstanding memory requests. If the cause of the wavefront stall is one or more outstanding memory requests, the scheduler signals a DVFS controller to boost at least one of a voltage and frequency of the memory to increase the speed at which the outstanding memory requests are fulfilled.

Further, the processing system employs a performance monitor to track stalls of threads of the wavefront across a plurality of memory channels. Although all threads of a wavefront are schedulable for concurrent execution, the threads of a wavefront typically complete execution at varying times. The variations in execution times for the threads of a wavefront are due to a number of factors, including an instruction buffer being empty, register file access stalls, barrier stalls, and memory stalls. If the performance monitor detects stalls due to memory stalls for a subset of the memory channels servicing memory access requests for threads of a wavefront, the performance monitor signals the DVFS controller to adjust at least one of the voltage and frequency (referred to collectively as "power") of the memory channels servicing memory access request for the wavefront based on the subset. For example, if a memory bus of the processing system includes four channels (referred to as Channel A, Channel B, Channel C, and Channel D) and the performance monitor identifies that the thread being serviced at Channel A is experiencing a memory stall (i.e., that fulfillment of memory access requests at Channel A are lagging in comparison to memory access requests at Channels B, C, and D), the performance monitor signals the DVFS controller to either increase (boost) power to Channel A or throttle power to Channels B, C, and D, or a combination thereof. By boosting power to the subset of channels (in this example, the subset including only Channel A), the DVFS controller enables the wavefront to complete processing more quickly, resulting in increased processing speed. Conversely, by throttling power to the remainder of channels (in this example, Channels B, C, and D), the DVFS controller saves power without affecting processing speed. Due to the inherent parallelism present in GPUs, the DVFS controller can continue to throttle frequency of the remainder of channels until the resulting wavefront stalls are hidden by other wavefronts or are dominated by other resource stalls. In particular, in GPU-based system-on-a-chip (SOC) designs, slower fulfillment of memory access requests impact performance only when the resulting wavefront stalls cannot be hidden by parallelism (i.e., by other wavefronts which are ready to be scheduled and executed).

FIG. 1 illustrates a processing system 100 that includes a performance monitor 125 and dynamic voltage and frequency scaling (DVFS) controller 127 for adjusting power on a per-memory-channel basis based on lagging memory access requests at a subset of channels in accordance with some embodiments. The processing system further includes a plurality of compute units 103, 105, 107, 109 of a GPU, each having a coalescer 145, a memory controller 115, a memory bus 130 including a plurality of channels CH A 131, CH B 132, CH C 133, and CH D 134, and a memory 140, which stores instructions and data used by the compute units 103, 105, 107, 109, and results produced by the computes units 103, 105, 107, 109. Although for purposes of illustration four compute units are depicted in FIG. 1, it will be appreciated that the processing system 100 may include fewer or more than four compute units. The processing system 100 can be incorporated in any of a variety of electronic devices, such as a server, personal computer, tablet, set top box, gaming system, automobile, and the like. Some embodiments of the processing system 100 include an input/output (I/O) engine (not shown) for handling input or output operations associated with the display 140, as well as other elements of the processing system 100 such as keyboards, mice, printers, external disks, and the like.

The processing system 100 includes memory 140, which in some embodiments is implemented as a dynamic random access memory (DRAM), and in some embodiments, is implemented using other types of memory including static random access memory (SRAM), non-volatile RAM, and the like. In some embodiments, the memory 140 is implemented using multiple double data rate (DDR), DDR2, DDR3, or DDR4 memory modules. The compute units 103, 105, 107, 109 access the memory 140 via the memory controller 115 over the memory bus 130.

The memory controller 115 includes a scheduler 120 and is configured to control access to the memory 140. For example, the memory controller 115 receives requests to access locations within the memory 140, and then the scheduler 120 of the memory controller 115 schedules the access requests. In some embodiments, the compute units 103, 105, 107, 109 are also associated with caches (not shown) that are used to cache data or instructions that are frequently used by the compute unites 103, 105, 107, 109. Information in the caches is accessed using addresses included in the memory access requests.

The compute units 103, 105, 107, 109 are multithreaded processors that are able to execute a thread concurrently with execution of other threads in a wavefront. For example, each thread that is concurrently performing a memory access instruction on the compute unit 103 (e.g., a read or a write to a memory location indicated by an address in the instruction) initially attempts to find data that is stored at the memory location in the cache (not shown). If the memory access hits in the cache, the thread is able to perform the memory access instruction using the cached information. However, if the memory access misses in the cache, the thread is required to perform the memory access instruction on the actual location in the memory 140. All of the threads in a wavefront must complete execution of the memory access instruction before the thread is allowed to proceed to a subsequent instruction.

The memory bus 130 is implemented in some embodiments in the form of a set of wires or conductors configured to connect electrical components and allow transfers of data and addresses from the memory 140 to the memory controller 115. Some embodiments of the memory bus 130 are implemented as high bandwidth interconnects according to industry standards such as Peripheral Component Interconnect Express (PCIe), cache coherent interconnect for accelerators (CCIX), open coherent accelerator processor interface (OpenCAPI), and Gen-Z. Some embodiments of the memory bus 130 use proprietary technologies. The memory bus 130 includes multiple channels for addressing the one or more components of the memory 140. In some embodiments, these separate channels allow the memory controller access to each of a plurality of memory modules.

The coalescers 145 identify spatial locality between memory addresses that are the subject of outstanding memory access requests from threads of the wavefronts 135. The coalescers 145 group together outstanding memory access requests from threads of the wavefronts 135 that are addressed to the same cache lines and send the grouped requests to the memory 140 via the channels CH A 131, CH B 132, CH C 133, and CH D 134 of the memory bus 130 at the same time. In this way, the coalescers 145 combine the individual requests from the wavefronts 135, based on their target addresses, to form as few cache-line sized requests as possible, thus reducing bandwidth requirements by reducing redundant accesses to the same cache line. The coalescers 145 may be implemented as hard-coded logic of the processing system 100, as firmware or programmable logic of the processing system 100, as software executed by the processing system 100, or a combination thereof.

Memory divergence occurs when concurrent memory requests from threads in a single wavefront spend different amounts of time retrieving their associated data from memory. Memory divergence leads to stalling of the wavefronts when different threads in the wavefront perform a memory instruction using different physical locations such as a cache or the memory 140. Further, some channels have a larger contribution toward lagging memory requests (also referred to as "tail requests") than other channels. The variation in tail requests from different channels is often significant and is not necessarily due to an imbalance in traffic.

To leverage memory divergence across a plurality of channels and the parallelism of threads in a wavefront in order to save power and improve performance, the scheduler 120 tracks wavefront stalls due to factors other than outstanding memory access requests and the performance monitor 125 tracks tail requests across the plurality of channels (e.g., CH A 131, CH B 132, CH C 133, and CH D 134) of the memory bus 130. The scheduler 120 and the performance monitor 125 signal the DVFS controller 127 to adjust power to the memory 140 or to a subset of channels of the memory 140 based on identified causes of wavefront stalls and identification of a subset of the memory channels CH A 131, CH B 132, CH C 133, and CH D 134 contribution to tail requests.

For example, at each scheduling cycle, the scheduler 120 checks wavefronts received at the memory controller 115 to determine if the wavefronts are ready to be scheduled. The scheduler 120 measures the frequency and count of wavefronts blocked by various causes, such as memory stalls, register file stalls, barrier stalls, and instruction buffer stalls. In some embodiments, the scheduler 120 employs counters and logical circuitry to determine the frequency and count of wavefront stalls due to different causes. If a wavefront is ready to be scheduled, the scheduler 120 schedules the wavefront. If no wavefronts are ready to be scheduled, the scheduler 120 determines whether the cause of the wavefront stall is due to factors other than memory stalls. If the wavefront stall is due to one or more factors other than a memory stall, the scheduler 120 signals the DVFS controller 127 to throttle at least one of the voltage and frequency of the memory 140 such that the memory 140 saves power while the wavefront stall is resolved. Conversely, if the scheduler 120 determines that the wavefront stall is due to a memory stall, the scheduler 120 signals the DVFS controller to boost at least one of the voltage and frequency of the memory 140 such that the memory 140 is able to fulfill the outstanding memory access request and resolve the wavefront stall more quickly, thereby improving performance of the processing system 100.

Further, the performance monitor 125 tracks the contribution of each channel CH A 131, CH B 132, CH C 133, and CH D 134 to tail requests. Reasons for channels contributing differently to tail requests include 1) the load distribution across channels being different and varying with time, 2) unsymmetrical topology leading to certain links being more highly utilized than others, resulting in varying roundtrip latencies, 3) varying row buffer hits across channels, and 4) varying coherence traffic from different channels. In some embodiments, when a wavefront 135 is not ready to be scheduled due to outstanding memory access requests, the performance monitor 125 tracks the number of outstanding requests from each of the channels CH A 131, CH B 132, CH C 133, and CH D 134 and accumulates the distribution of outstanding memory access requests across the channels over a period of time, such as a number of scheduler cycles. Based on the distribution of outstanding memory access requests across the channels, the performance monitor 125 identifies a subset of the channels that has a greater contribution toward tail requests of the wavefront 135 than the remainder of the channels.

In some embodiments, the performance monitor 125 tracks the contribution toward tail requests of each of the channels CH A 131, CH B 132, CH C 133, and CH D 134 by measuring the roundtrip latencies of requests serviced from different channels at the coalescer 145. The variation in roundtrip latencies across the channels CH A 131, CH B 132, CH C 133, and CH D 134 indicates how each of the different channels contribute to tail requests. The performance monitor 125 identifies a subset of the channels CH A 131, CH B 132, CH C 133, and CH D 134 that contributes more to tail requests based on the variation in roundtrip latencies (i.e., the subset of channels having the longest roundtrip latencies). The performance monitor 125 may be implemented as hard-coded logic of the processing system 100, as firmware or programmable logic of the processing system 100, as software executed by the processing system 100, or a combination thereof.

The performance monitor 125 signals the DVFS controller 127 to adjust at least one of the voltage and frequency of each of the channels CH A 131, CH B 132, CH C 133, and CH D 134 based on the identification of the subset. In some embodiments, the performance monitor 125 signals the DVFS controller 127 to increase at least one of the voltage and frequency of the subset of channels such that the memory 140 is able to fulfill the outstanding memory access requests more quickly. In some embodiments, the performance monitor 125 signals the DVFS controller 127 to throttle at least one of the voltage and frequency of the remainder of the channels (i.e., the channels not included in the subset) such that the processing system 100 saves power at the remainder of the channels while the subset of channels services the outstanding memory access requests. The DVFS controller 127 throttles the memory channels such that scheduler stalls due to outstanding memory access requests are not more than a threshold. In some embodiments, the performance monitor 125 signals the DVFS controller 127 to boost power to the subset while throttling power to the remainder of the channels CH A 131, CH B 132, CH C 133, and CH D 134, thereby simultaneously saving power and improving performance.

Figure 2:
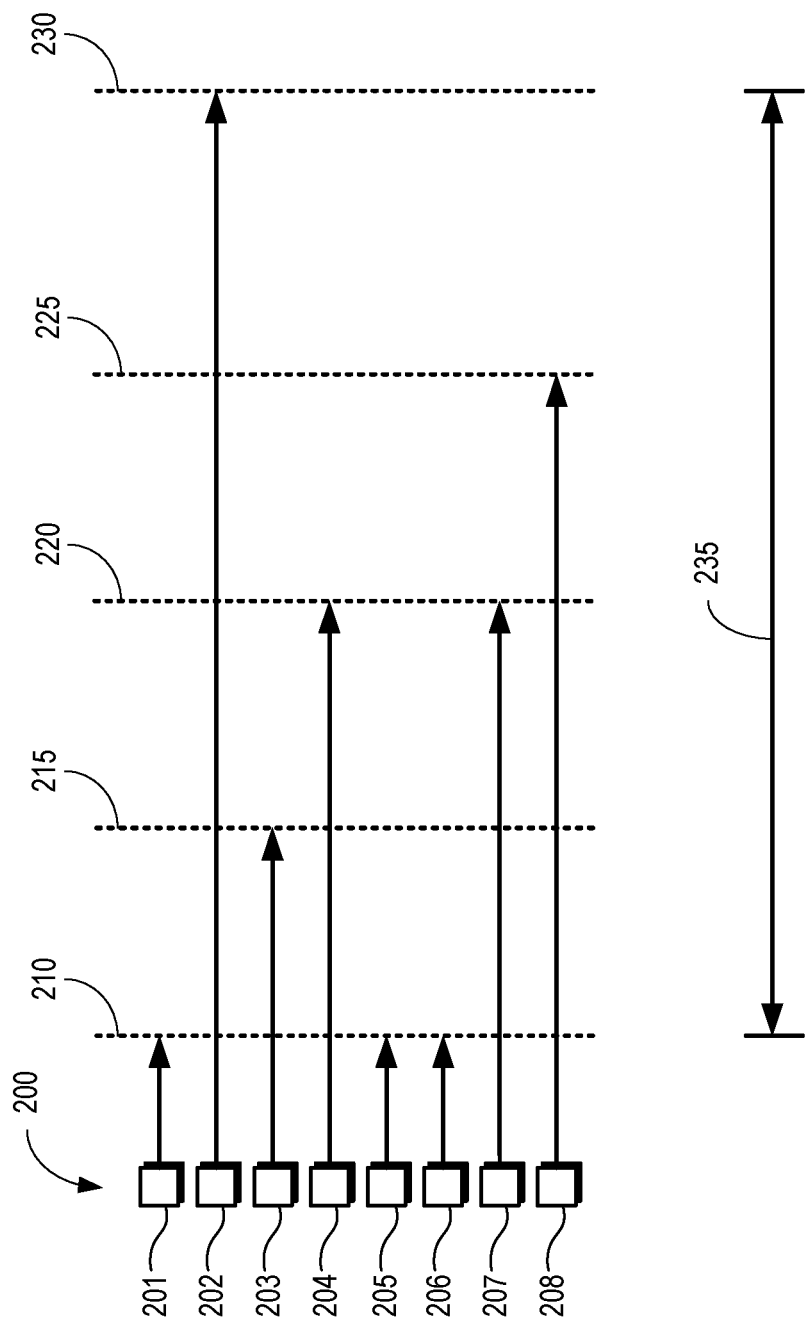
FIG. 2 is a diagram illustrating varying latencies of threads across a plurality of memory channels.

FIG. 2 is a diagram illustrating varying latencies of threads of a wavefront 200 across a plurality of memory channels. The wavefront 200 executes on some embodiments of the processing system 100 shown in FIG. 1. Time increases from left to right in FIG. 2. The line 210 indicates a latency to service a memory access request that hits in a cache, and the lines 215, 220, 225, and 230 indicates latencies to service memory access requests that miss in the cache and are addressed to locations in the memory 140. Lines 210, 215, 220, 225, and 230 are also referred to herein as latencies 210, 215, 220, 225, and 230, respectively.

The wavefront 200 includes eight threads 201, 202, 203, 204, 205, 206, 207, and 208 that concurrently perform the same memory access request and that are each serviced by different channels of the memory bus 130 (in this example, eight channels). Threads 201, 205, and 206 hit in the corresponding cache and have a latency 210. Thread 203 has a latency 215 that is longer than latency 210. Threads 204 and 207 have a latency 220 that is longer than latency 215. Thread 208 has a latency 225 that is longer than latency 220, and thread 202 has a latency 230 that is longer than latency 225. The latency for the wavefront 200 is therefore equal to the longest latency for the threads 201-208, which is equal to the latency 230. The latencies of the threads 201-208 differ by a time interval 235 that is equal to a difference between the latency 210 associated with the cache and the longest latency 230 associated with the memory 140.

All of the threads 201-208 in the wavefront 200 must complete execution of the memory access instruction before the wavefront is allowed to proceed to a subsequent instruction. To improve performance and save power, the performance monitor 125 identifies a subset of channels through which fulfillment of memory access requests is lagging in comparison to the remainder of the plurality of channels. In the illustrated example, depending on the criteria applied by the performance monitor 125 in identifying the subset, the subset includes one or more of the channels servicing threads 202, 204, 207, and 208, as these channels exhibit the longest latencies. The performance monitor 125 signals the DVFS controller 127 to either boost power to the channels servicing the subset or throttle power to the remaining channels (e.g., the channels servicing threads 201, 203, 205, and 206), or both.

Figure 3:
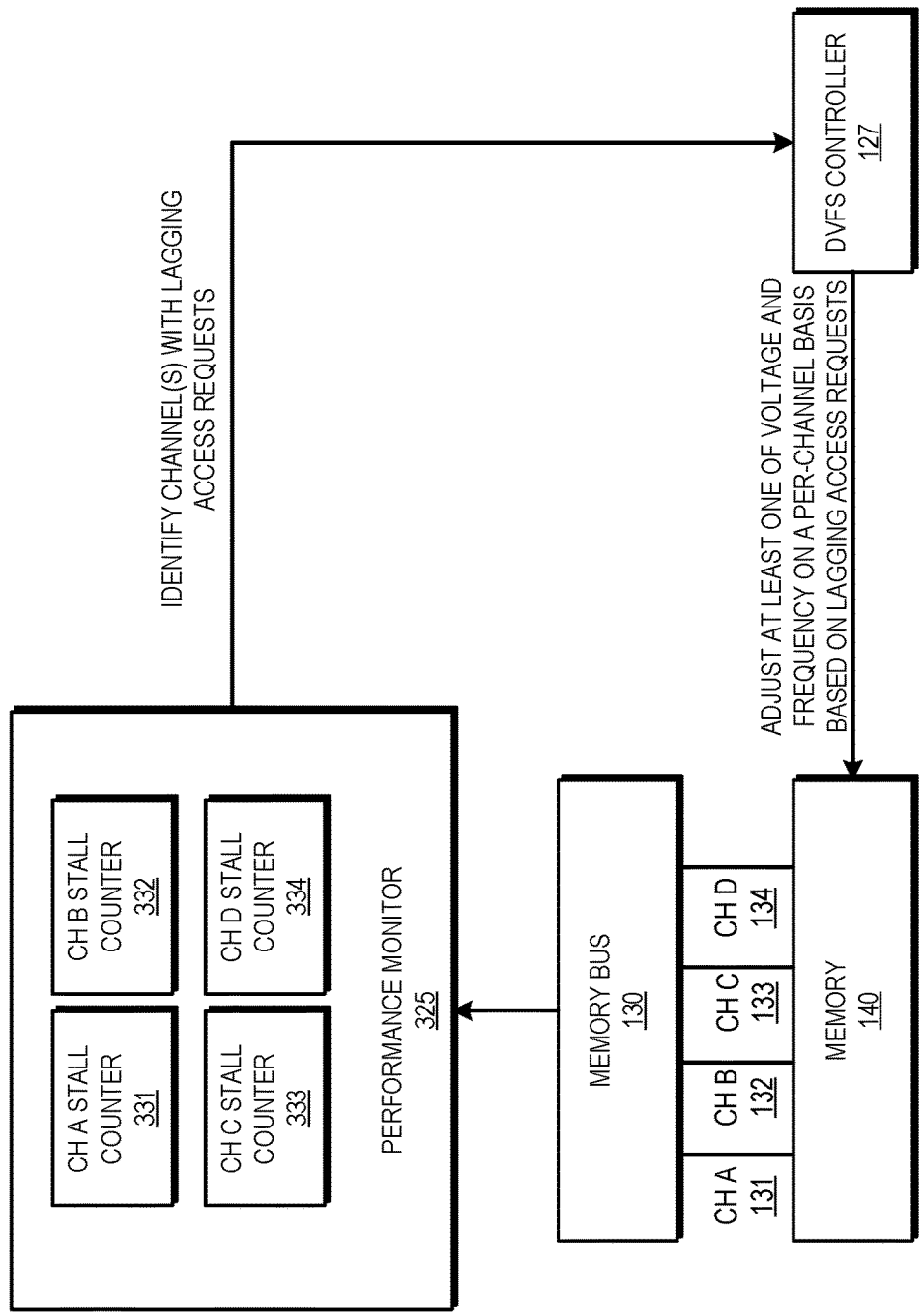
FIG. 3 is a block diagram of a performance monitor that includes counters to identify a subset of memory channels with lagging access requests and a DVFS controller for adjusting power to the memory channels based on the identified subset in accordance with some embodiments.

FIG. 3 is a block diagram of a performance monitor 325 that includes counters CH A stall counter 331, CH B stall counter 332, CH C stall counter 333, and CH D stall counter 334 to identify a subset of memory channels with lagging access requests and a DVFS controller 127 for adjusting power to the memory channels CH A 131, CH B 132, CH C 133, and CH D 134 of the memory 140 of FIG. 1 based on the identified subset in accordance with some embodiments. When a wavefront (not shown) is not ready to be scheduled due to outstanding memory access requests, the performance monitor 325 tracks the number of outstanding requests from each of the channels CH A 131, CH B 132, CH C 133, and CH D 134 and accumulates the distribution of outstanding memory access requests across the channels over a number N of scheduler cycles, referred to as the history window.

For example, counters CH A stall counter 331, CH B stall counter 332, CH C stall counter 333, and CH D stall counter 334 accumulate the distribution of outstanding memory access requests across the channels CH A 131, CH B 132, CH C 133, and CH D 134 as shown in Table 1 below:

TABLE 1

| Scheduler cycle | Per-channel outstanding requests | | | | Status |
| --- | --- | --- | --- | --- | --- |
| | CH A | CH B | CH C | CH D | |
| 1 | 0 | 4 | 2 | 0 | Stall |
| 2 | 0 | 2 | 1 | 0 | Stall |
| 3 | 0 | 1 | 0 | 0 | Stall |
| 4 | 0 | 0 | 0 | 0 | Ready |

In this example, the contribution of CH B 132 toward outstanding memory access requests over a history window of four scheduler cycles is 3, the contribution of CH C 133 toward outstanding memory access requests over the history window is 2, and the contributions of CH A 131 and CH D 134 toward outstanding memory access requests over the history window are both 0. Based on the distribution of outstanding memory access requests across the channels, the performance monitor 325 identifies CH B 132 and CH C 133 as being included in the subset of the channels that has a greater contribution toward tail requests of the wavefront than the remainder of the channels.

The hardware overhead for the counters increases with the size of the history window and the number of memory instructions tracked. By sampling only a few instructions at a time and including small counters for each channel, the overhead can be limited. For example, by tracking 16 instructions at a time across 16 channels, a 4-bit counter with a history of 1 will have a total 128 byte overhead.

The performance monitor 325 identifies the subset of channels with lagging access requests to the DVFS controller 127 and instructs the DVFS controller 127 to adjust at least one of the voltage and frequency of the memory 140 on a per-channel basis based on the identified subset of channels. For example, to save power, the performance monitor 325 instructs the DVFS controller 127 to throttle power to the remainder of the channels (CH A 131 and CH D 134 in this example). Alternatively, to improve performance, the performance monitor 325 instructs the DVFS controller 127 to boost power to the subset of channels so that the subset of channels can service the outstanding memory access requests more quickly. In some embodiments, the performance monitor 325 signals the DVFS controller 127 to both boost power to the subset of channels and throttle power to the remainder of the channels.

Figure 4:
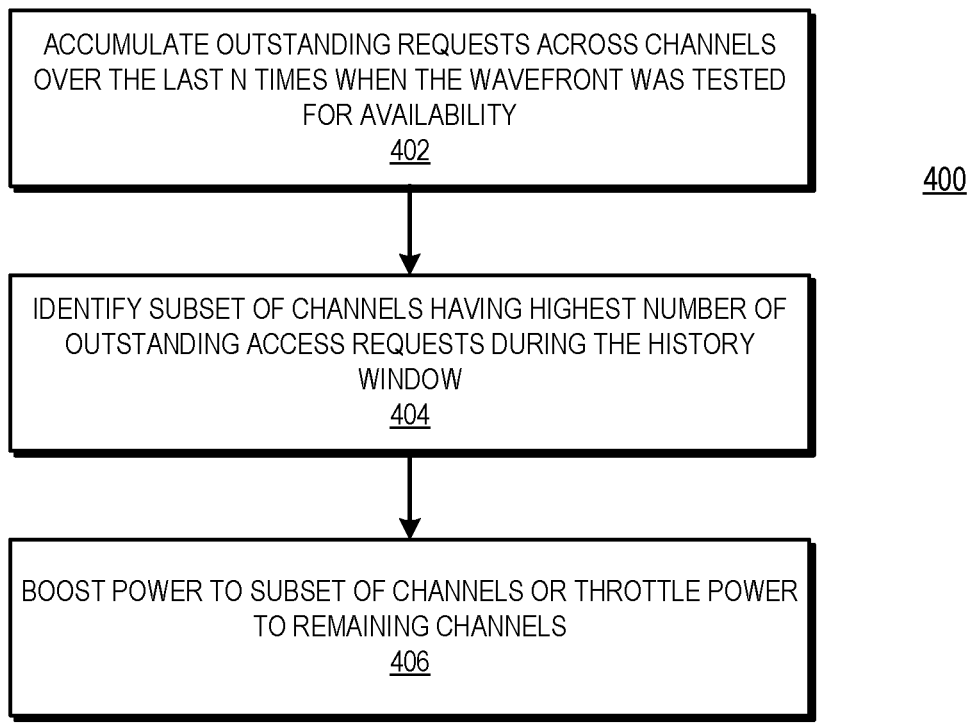
FIG. 4 is a flow diagram of a method of identifying a subset of channels having a high number of outstanding access requests based on an accumulation of requests across channels in accordance with some embodiments.

FIG. 4 is a flow diagram of a method 400 of identifying a subset of channels having a high number of outstanding access requests based on an accumulation of requests across channels in accordance with some embodiments. The method 400 is implemented in some embodiments of the performance monitor 125, 325 and the DVFS controller 127 shown in FIGS. 1 and 3. At block 402, the performance monitor 325 accumulates outstanding memory access requests across channels of the memory bus 130 over the last N times when the wavefront was tested for availability for scheduling. At block 404, the performance monitor 325 identifies the subset of channels having the highest numbers of outstanding memory access requests during the history window of N scheduling cycles. At block 406, the performance monitor 325 signals the DVFS controller 127 to boost power to the subset of channels, or throttle power to the remaining channels not in the subset, or to both boost power to the subset of channels and throttle power to the remaining channels not in the subset.

Figure 5:
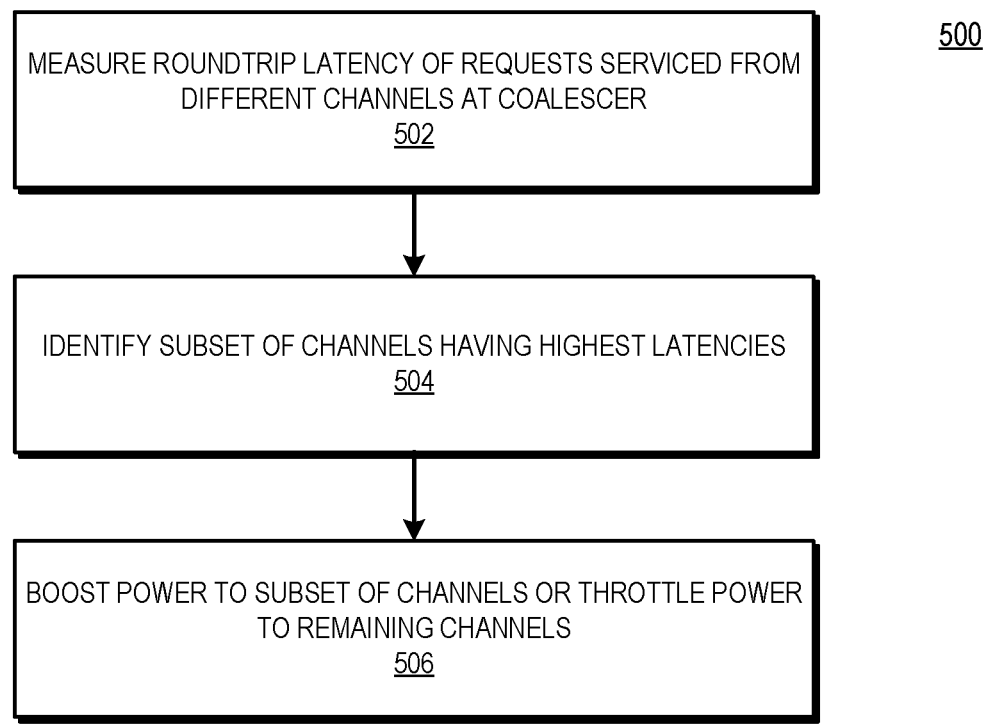
FIG. 5 is a flow diagram of a method of identifying a subset of channels having high memory access latencies based on roundtrip latencies of requests served from different channels at a coalescer in accordance with some embodiments.

FIG. 5 is a flow diagram of a method 500 of identifying a subset of channels having high memory access latencies based on roundtrip latencies of requests served from different channels at a coalescer in accordance with some embodiments. The method 500 is implemented in some embodiments of the performance monitor 125, coalescer 145, and the DVFS controller 127 shown in FIG. 1. At block 502, the performance monitor 125 measures the roundtrip latencies of memory access requests serviced from different channels of the memory bus 130 at the coalescer 145. At block 504, the performance monitor 125 identifies a subset of the channels having the highest latencies. At block 506, the performance monitor 125 signals the DVFS controller 127 to boost power to the subset of channels, or throttle power to the remaining channels not in the subset, or to both boost power to the subset of channels and throttle power to the remaining channels not in the subset.

Figure 6:
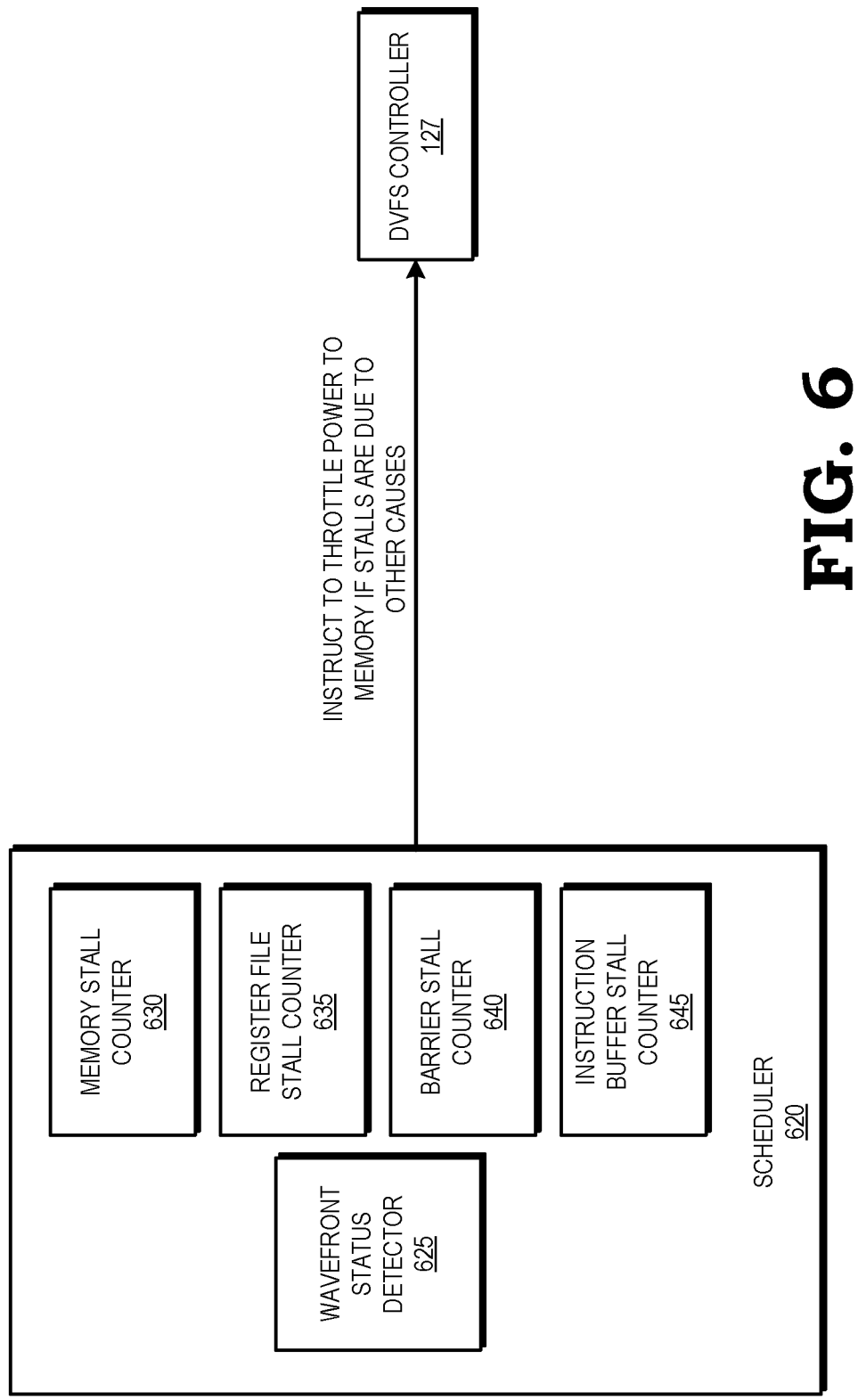
FIG. 6 is a block diagram of a scheduler that includes stall counters for identifying the causes of stalls of a wavefront in accordance with some embodiments.

FIG. 6 is a block diagram of a scheduler 620 that includes stall counters for identifying the causes of stalls of a wavefront in accordance with some embodiments. In particular, the scheduler 620 tracks the proportion of wavefront stalls that cannot be hidden by available parallelism. The scheduler 620 includes a wavefront status detector 625, a memory stall counter 630, a register file stall counter 635, a barrier stall counter 640, and an instruction buffer stall counter 645. The wavefront status detector 625 may be implemented as hard-coded logic of the scheduler 620, as firmware or programmable logic of the scheduler 620, as software executed by the scheduler 620, or a combination thereof. The wavefront status detector 625 checks wavefronts at each scheduling cycle to determine if the wavefronts are ready to be scheduled. The wavefront status detector 625 indicates for each wavefront if the wavefront is ready for scheduling or if it is stalled.

If the wavefront status detector 625 detects that a wavefront is stalled, the memory stall counter 630 determines whether the stall is due to one or more outstanding memory access requests. The memory stall counter 630 may be implemented as hard-coded logic of the scheduler 620, as firmware or programmable logic of the scheduler 620, as software executed by the scheduler 620, or a combination thereof. Similarly, the register file stall counter 635, the barrier stall counter 640, and the instruction buffer stall counter 645 determine whether the stall is due to a register file stall, a barrier stall, or an instruction buffer stall, respectively. Each of the register file stall counter 635, the barrier stall counter 640, and the instruction buffer stall counter 645 may be implemented as hard-coded logic of the scheduler 620, as firmware or programmable logic of the scheduler 620, as software executed by the scheduler 620, or a combination thereof.

If the memory stall counter 630 determines that the stall is due to one or more outstanding memory access requests, the scheduler 620 signals the DVFS controller 127 to boost power to the memory 140. If the memory stall counter 630 determines that the stall is not due to outstanding memory access requests and one or more of the register file stall counter 635, the barrier stall counter 640, and the instruction buffer stall counter 645 determine that the stall is due to a cause other than a memory stall, such as a register file stall, a barrier stall, or an instruction buffer stall, the scheduler 620 signals the DVFS controller 127 to throttle power to the memory 140. In this way, the DVFS controller 127 can save power at the memory 140 while the cause of the stall is resolved.

FIG. 7 is an illustration of information collected at the scheduler 620 of FIG. 6 identifying causes of stalls of a wavefront in accordance with some embodiments. For wavefront WF0 702, the wavefront status detector 625 detects that the wavefront is ready to be scheduled, as indicated by the fact that there are no stalls detected by any of the memory stall counter 630, the register file stall counter 635, the barrier stall counter 640, or the instruction buffer stall counter 645. For wavefront WF1 704, the wavefront status detector 625 detects that the wavefront is stalled. The memory stall counter 630 detects that wavefront WF1 704 has one or more outstanding memory access requests and none of the register file stall counter 635, the barrier stall counter 640, or the instruction buffer stall counter 645 detect any other stalls for wavefront WF1 704. For wavefront WF2 706, the wavefront status detector 625 detects that the wavefront is stalled. The memory stall counter 630 does not detect any outstanding memory access requests for wavefront WF2 706; however, the register file stall counter 635 detects a register file stall for wavefront WF2 706. For wavefront WF3 708, the wavefront status detector 625 detects that the wavefront is stalled. The memory stall counter 630 does not detect any outstanding memory access requests for wavefront WF3 708; however, as with WF2 706, the register file stall counter 635 detects a register file stall for wavefront WF3 708.

Based on the information collected at the scheduler 620, the scheduler 620 schedules the wavefront WF0 702 for execution. For wavefront WF1 704, the scheduler 620 signals the DVFS controller 127 to boost power to the channels of the memory 140 that are contributing to the outstanding memory access requests so the outstanding memory access request(s) can be serviced more quickly. For wavefronts WF2 706 and WF3 708, the scheduler 620 signals the DVFS controller 127 to throttle power to the remainder of memory channels of the memory 140 to save power while the register file stalls are resolved.

Figure 8:
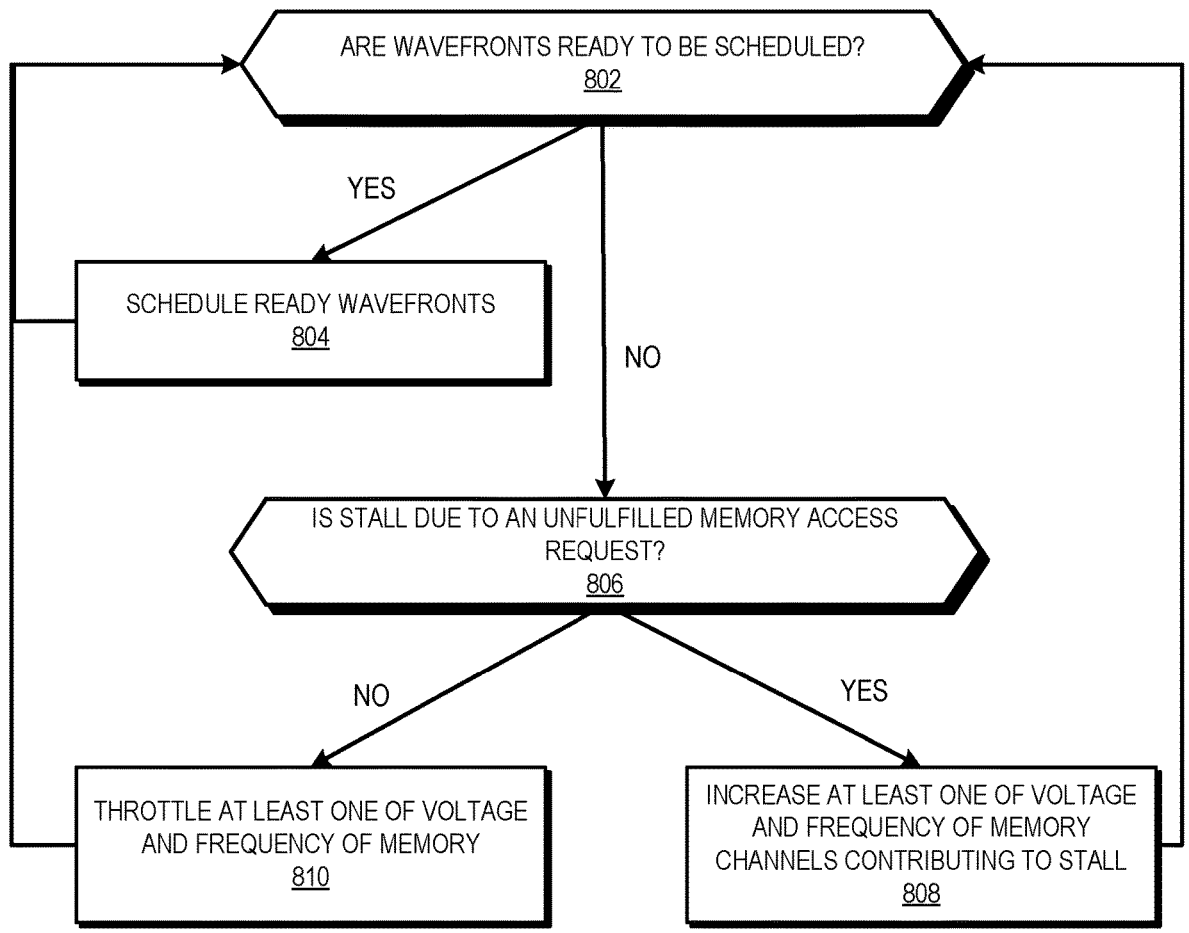
FIG. 8 is a flow diagram illustrating a method for adjusting power to a memory based on a determination of whether a wavefront stall is due to an unfulfilled memory access request in accordance with some embodiments.

FIG. 8 is a flow diagram illustrating a method 800 for adjusting power to the memory 140 based on a determination of whether a wavefront stall is due to an unfulfilled memory access request in accordance with some embodiments. The method 800 is implemented in some embodiments of the scheduler 120 and the DVFS controller 127 shown in FIG. 1. At block 802, the scheduler 120 determines if any wavefronts are ready to be scheduled. If, at block 802, the scheduler 120 determines that a wavefront is ready to be scheduled, the method flow continues to block 804. At block 804, the scheduler 120 schedules the ready wavefront, after which the method flow continues back to block 802.

If, at block 802, the scheduler 120 determines that no wavefronts are ready to be scheduled, the method flow continues to block 806. At block 806, the scheduler determines whether the stall is due to an unfulfilled (i.e., outstanding) memory access request. If, at block 806, the scheduler determines that the stall is due to an unfulfilled memory access request, the method flow continues to block 808. At block 808, the scheduler 120 signals the DVFS controller 127 to increase at least one of a voltage and frequency of channels of the memory 140 contributing to the stall or reduces the frequency or voltage of non-contributing channels of the memory 140, or a combination of both, after which the method flow continues back to block 802.

If, at block 806, the scheduler 120 determines that the stall is due to something other than an outstanding memory access request, the method flow continues to block 810. At block 810, the scheduler 120 signals the DVFS controller 127 to throttle at least one of the voltage and frequency of the memory 140 for as long as stalls due to causes other than unfulfilled memory requests are dominant across different wavefronts. The method flow then continues back to block 802.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    monitoring stalls of a first wavefront comprising a first plurality of threads schedulable for concurrent execution of the same instruction on different data, the threads comprising memory access requests distributed across a plurality of channels to access a memory;
    identifying a first subset of the plurality of channels through which fulfillment of memory access requests associated with threads of the first wavefront is lagging in comparison to a remainder of the plurality of channels, the remainder comprising channels of the plurality of channels not within the first subset; and
    adjusting a voltage or a frequency of at least one of the plurality of channels based on the first subset.

2. The method of claim 1, wherein adjusting comprises increasing the voltage or frequency of the first subset of the plurality of channels.

3. The method of claim 1, wherein adjusting comprises throttling the voltage or frequency of the remainder of the plurality of channels.

4. The method of claim 3, wherein throttling is limited such that stalls at a scheduler due to outstanding memory requests are lower than a threshold.

5. The method of claim 1, further comprising:
    determining, at a scheduler, if a second wavefront comprising a second plurality of threads schedulable for concurrent execution is ready to be scheduled;
    in response to determining that a second plurality of threads is not ready to be scheduled, identifying a cause for a stall at the second plurality of threads; and
    in response to identifying a cause for the stall other than a memory stall, throttling the voltage or frequency of the memory.

6. A method comprising:
    monitoring stalls of a first plurality of threads schedulable for concurrent execution, the threads comprising memory access requests distributed across a plurality of channels to access a memory;
    identifying a first subset of the plurality of channels through which fulfillment of memory access requests is lagging in comparison to a remainder of the plurality of channels, the remainder comprising channels of the plurality of channels not within the first subset;
    adjusting a voltage or a frequency of at least one of the plurality of channels based on the first subset;
    measuring roundtrip latencies of memory access requests of the first plurality of threads across a second subset of the plurality of channels, the second subset comprising channels for which memory access requests are serviced at a coalescer;
    identifying a contribution of each channel of the second subset to lagging memory access requests based on the roundtrip latencies; and
    adjusting the voltage or frequency of the second subset based on the contributions.

7. The method of claim 1, wherein identifying the first subset comprises:
    tracking a number of outstanding memory access requests at each channel of the plurality of channels;
    tracking a distribution of outstanding memory access requests across the plurality of channels for a history window; and
    identifying the first subset based on a number of outstanding memory access requests at each channel during the history window.

8. A method, comprising:
    comparing latencies across a plurality of channels of a memory bus of a first wavefront comprising a first plurality of threads schedulable for concurrent execution of the same instruction on different data; and
    throttling a voltage or a frequency of a first subset of the plurality of channels based on latencies at the first subset being less than latencies at a second subset of the plurality of channels different from the first subset.

9. The method of claim 8, wherein throttling comprises throttling until latency of the first plurality of threads due to the throttling is hidden by a second wavefront comprising a second plurality of threads schedulable for concurrent execution.

10. A method comprising:
    comparing latencies across a plurality of channels of a first plurality of threads schedulable for concurrent execution; and
    throttling a voltage or a frequency of a first subset of the plurality of channels based on latencies at the first subset being less than latencies at a second subset of the plurality of channels different from the first subset, wherein comparing latencies comprises:
        measuring roundtrip latencies of memory access requests of the first plurality of threads across a subset of the plurality of channels, the subset comprising channels for which memory access requests are serviced at a coalescer;
        identifying a contribution of each channel of the subset to lagging memory access requests based on the roundtrip latencies; and
        adjusting the voltage or frequency of the subset based on the contributions.

11. The method of claim 8, wherein comparing latencies comprises:
    tracking a number of outstanding memory access requests at each channel of the plurality of channels for a history window; and identifying the first subset based on a number of outstanding memory access requests at each channel during the history window.

12. The method of claim 8, further comprising:
determining, at a scheduler, if a second plurality of threads schedulable for concurrent execution is ready to be scheduled;
in response to determining that a second plurality of threads is not ready to be scheduled, identifying a cause for a stall at the second plurality of threads; and
in response to identifying a cause for the stall other than a memory stall, throttling the voltage or frequency of a memory coupled to the memory bus.

13. The method of claim 8, further comprising increasing the voltage or frequency of the second subset of the plurality of channels.

14. The method of claim 8, wherein throttling is limited such that stalls at a scheduler due to outstanding memory requests are lower than a threshold.

15. A device, comprising:
a compute unit;
a memory;
a bus comprising a plurality of channels connecting the compute unit to the memory;
a scheduler to schedule a first wavefront comprising a first plurality of threads for execution at the compute unit, the first plurality of threads schedulable for concurrent execution of the same instruction on different data and comprising memory access requests distributed across the plurality of channels to access the memory;
a performance monitor to:
monitor stalls of the first plurality of threads;
identify a first subset of the plurality of channels through which fulfillment of memory access requests is lagging in comparison to a remainder of the plurality of channels, the remainder comprising channels of the plurality of channels not within the first subset; and
a controller to adjust a voltage or a frequency of at least one of the plurality of channels based on the first subset.

16. The device of claim 15, wherein the controller is to increase the voltage or frequency of the first subset of the plurality of channels.

17. The device of claim 15, wherein the controller is to throttle the voltage or frequency of the remainder of the plurality of channels.

18. The device of claim 17, wherein the controller is to limit throttling such that stalls at the scheduler due to outstanding memory requests are lower than a threshold.

19. The device of claim 15, wherein the scheduler is to:
determine if a second wavefront comprising a second plurality of threads schedulable for concurrent execution is ready to be scheduled; and
in response to determining that a second plurality of threads is not ready to be scheduled, identify a cause for a stall at the second plurality of threads; and
wherein, in response to the scheduler identifying a cause for the stall other than a memory stall, the controller is to throttle the voltage or frequency of the memory.

20. A device comprising:
a compute unit;
a memory;
a bus comprising a plurality of channels connecting the compute unit to the memory;
a scheduler to schedule a first plurality of threads for execution at the compute unit, the first plurality of threads schedulable for concurrent execution and comprising memory access requests distributed across the plurality of channels to access the memory;
a performance monitor to:
monitor stalls of the first plurality of threads;
identify a first subset of the plurality of channels through which fulfillment of memory access requests is lagging in comparison to a remainder of the plurality of channels, the remainder comprising channels of the plurality of channels not within the first subset;
measure roundtrip latencies of memory access requests of the first plurality of threads across a second subset of the plurality of channels, the second subset comprising channels for which memory access requests are serviced at a coalescer;
identify a contribution of each channel of the second subset to lagging memory access requests based on the roundtrip latencies; and
a controller to:
adjust a voltage or a frequency of at least one of the plurality of channels based on the first subset; and
adjust the voltage or frequency of the second subset based on the contributions.

\* \* \* \* \*